United States Patent
Morioka

(10) Patent No.: US 10,863,516 B2
(45) Date of Patent: Dec. 8, 2020

(54) COMMUNICATIONS DEVICE AND METHOD

(71) Applicant: SONY CORPORATION, Tokyo (JP)

(72) Inventor: Yuichi Morioka, Reading (GB)

(73) Assignee: CONVIDA WIRELESS, LLC, Wilmington, DE (US)

(*) Notice: Subject to any disclaimer, the term of this patent is extended or adjusted under 35 U.S.C. 154(b) by 0 days.

(21) Appl. No.: 16/231,702

(22) Filed: Dec. 24, 2018

(65) Prior Publication Data
US 2019/0132849 A1 May 2, 2019

Related U.S. Application Data

(63) Continuation of application No. 14/414,169, filed as application No. PCT/GB2013/052274 on Aug. 29, 2013, now Pat. No. 10,187,897.

(30) Foreign Application Priority Data

Aug. 31, 2012 (GB) .................................. 1215581.8

(51) Int. Cl.
*H04W 72/04* (2009.01)
*H04L 5/00* (2006.01)
*H04W 92/10* (2009.01)

(52) U.S. Cl.
CPC ......... *H04W 72/0486* (2013.01); *H04L 5/001* (2013.01); *H04L 5/0053* (2013.01);
(Continued)

(58) Field of Classification Search
None
See application file for complete search history.

(56) References Cited

U.S. PATENT DOCUMENTS 9,526,068 B2 * 12/2016 Webb ................ H04W 72/0446
9,629,140 B2 * 4/2017 Morioka ............. H04W 72/048
(Continued)

FOREIGN PATENT DOCUMENTS

EP 2 756 725 A2 7/2014
EP 2 846 594 A1 3/2015
(Continued)

OTHER PUBLICATIONS

U.S. Appl. No. 61/646,169, filed May 11, 2012, Xu (Year: 2012).*
(Continued)

*Primary Examiner* — Jay L Vogel
(74) *Attorney, Agent, or Firm* — Xsensus LLP

(57) ABSTRACT

A mobile communications system communicates data to/from mobile communications devices, and provides a wireless access interface communicating data to/from the mobile communications devices, on a downlink first carrier providing plural communications resource elements across a first frequency range for communicating data, and within a second frequency range within and smaller than the first frequency range. The wireless access interface includes plural time divided sub-frames, each sub-frame including plural communications resource elements of the first frequency range and plural communications resource elements of the second frequency range. By arranging for a narrow band control channel to be within a virtual carrier and to communicate control information to both first full capability communications devices and second reduced capability communications devices, the second reduced capability devices can access the narrow band control channel which is shared with the first full-capability mobile devices, to make use of communications resources available to the communications system.

8 Claims, 11 Drawing Sheets ePDCCH Sharing (Distributed)

(52) U.S. Cl.
CPC .......... *H04L 5/0064* (2013.01); *H04L 5/0094* (2013.01); *H04W 72/042* (2013.01); *H04W 72/0453* (2013.01); *H04W 92/10* (2013.01)

(56) References Cited

U.S. PATENT DOCUMENTS

| | | | | |
|---|---|---|---|---|
| 9,967,821 | B2* | 5/2018 | Webb | H04W 52/0235 |
| 10,187,897 | B2* | 1/2019 | Morioka | H04W 72/0453 |
| 2010/0032215 | A1 | 12/2010 | Chen et al. | |
| 2011/0008545 | A1 | 4/2011 | Chen et al. | |
| 2013/0006411 | A1 | 1/2013 | Jones et al. | |
| 2013/0030155 | A1 | 1/2013 | Lewicki et al. | |
| 2013/0033627 | A1 | 2/2013 | Chen et al. | |
| 2013/0044693 | A1* | 2/2013 | Lindh | H04L 5/0051 370/329 |
| 2013/0223366 | A1* | 8/2013 | Papasakellariou | H04L 5/0094 370/329 |
| 2013/0242882 | A1 | 9/2013 | Blankenship et al. | |
| 2013/0272215 | A1* | 10/2013 | Khoryaev | H04W 28/02 370/329 |
| 2013/0286997 | A1* | 10/2013 | Davydov | H04W 72/042 370/329 |
| 2013/0301552 | A1* | 11/2013 | Xu | H04W 48/12 370/329 |
| 2013/0336279 | A1* | 12/2013 | Kim | H04L 5/0094 370/329 |

FOREIGN PATENT DOCUMENTS

| | | |
|---|---|---|
| EP | 2 849 514 A1 | 3/2015 |
| EP | 2 847 875 B1 | 1/2017 |
| RU | 2 434 365 C2 | 11/2011 |
| WO | 2007/051193 A2 | 5/2007 |
| WO | 2010/049754 A1 | 5/2010 |
| WO | 2010/118382 A1 | 10/2010 |
| WO | 2012/104629 A2 | 8/2012 |
| WO | 2012/104634 A1 | 8/2012 |
| WO | 2012/104635 A1 | 8/2012 |
| WO | 2012/104644 A1 | 8/2012 |
| WO | 2012/172323 A1 | 12/2012 |
| WO | 2013/040221 A2 | 3/2013 |
| WO | 2013/166104 A2 | 11/2013 |

OTHER PUBLICATIONS

U.S. Appl. No. 61/624,185, filed Apr. 13, 2012, Khoryaev (Year: 2012).*

U.S. Appl. No. 61/603,903, filed Feb. 27, 2012, Papasakellariou (Year: 2012).*

Examination Reported dated Feb. 19, 2019 in Indian Application No. 380/DELNP/2015.

Office Action issued in European Application 13 759 297.6-1215 dated Aug. 15, 2016.

Office Action issued in Chinese Application 201380040827.9 dated Aug. 13, 2018.

NEC Group, "Maximum Bandwidth Reduction for Low-Cost MTC UE based on L TE", 3GPF TSG RAN WG1 Meeting #68, 3GPP Draft; R1-120259, 3RD Generation Partnership Project (3GPP), 6 Pages total, (Feb. 6-10, 2012).

Ericsson et al., "Search Space for Enhanced Control Channels", 3GPP TSG-RAN WG1 #67, 2 Pages total, (Nov. 14-18, 2011).

Combined Office Action and Search Report dated Apr. 19, 2018 in Chinese Patent Application No. 201380040827.9, with English-language Translation, 13 pages.

Office Action dated Jul. 11, 2017 in Japanese Patent Application No. 2015-529124 (with Partial English language Translation).

Office Action dated Jun. 16, 2017 in United Kingdom Patent Application No. GB1215581.8.

R1-120111 (CATT): Design of E-PDCCH search space, 3GPP TSG RAN WG1 Meeting #68, Dresden, Germany, Feb. 6-10, 2012, 4 pages.

Xu, U.S. Appl. No. 61/646,169, filed May 11, 2012.

Office Action dated Apr. 7, 2017 in United Kingdom Patent Application No. GB 1215581.8.

"Review of Approaches for Bandwidth Reduction for Low Complexity MTG LTE UEs" IPWireless Inc., 3GPP TSG RAN WG1 Meeting #67, R1-114267, Nov. 9, 2011, 5 Pages.

Search Report dated Feb. 2, 2017 in Russian Patent Application No. 2015111560 (with English translation of categories of cited documents).

International Search Report dated Jan. 3, 2014 in PCT/GB2013/052274.

United Kingdom Search Report dated Nov. 22, 2012 in Patent Application No. GB1215581.8.

"Carrier Aggregation Operation in L TE-Advanced" Qualcomm Europe, 3GPP TSG RAN WG1 #54, XP050316622, 2008, 4 pages.

Office Action dated Nov. 15, 2019 in European Patent Application No. 13 759 297.8, 39 pages.

Office Action dated Nov. 19, 2019 in Korean Patent Application No. 10-2015-7004861, with English Summary, 7 pages.

Research in Motion et al., "Support Common Control Channel in E-PDCCH," 3GPP TSG RAN WG1 Meeting #68bis, R1-121479, Mar. 26-30, 2012, 5 pages.

* cited by examiner

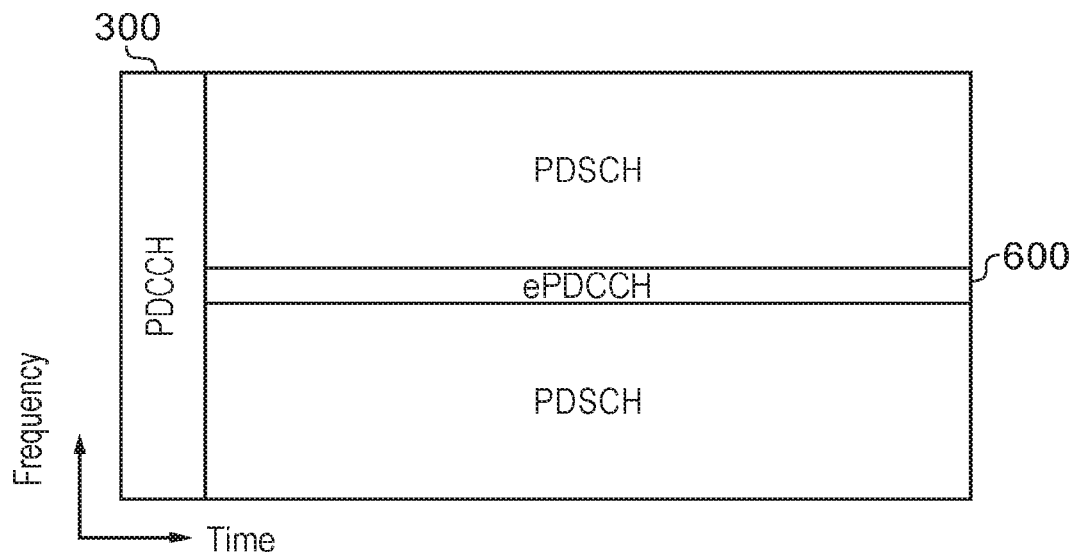
FIG. 5 Rel-11 ePDCCH (Localized)
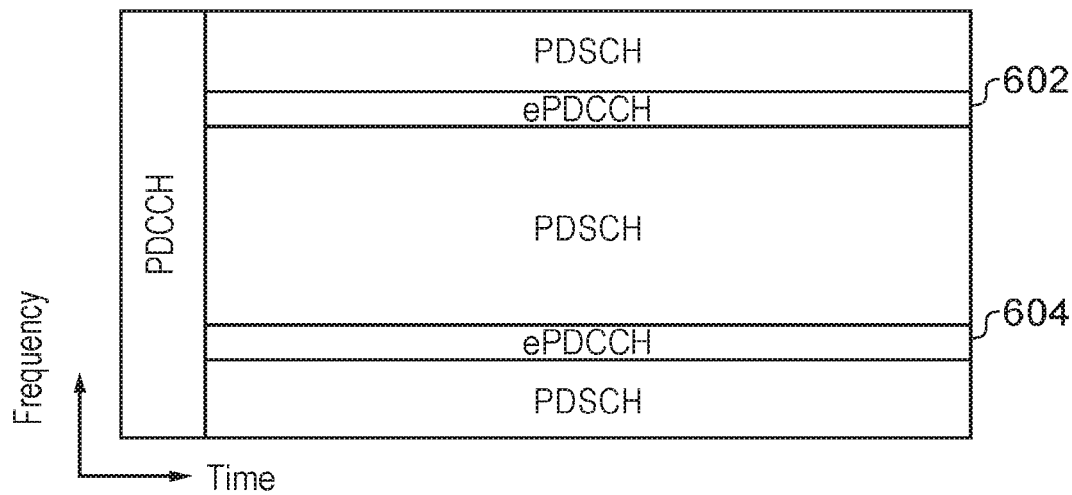
FIG. 6 Rel-11 ePDCCH (Distributed)

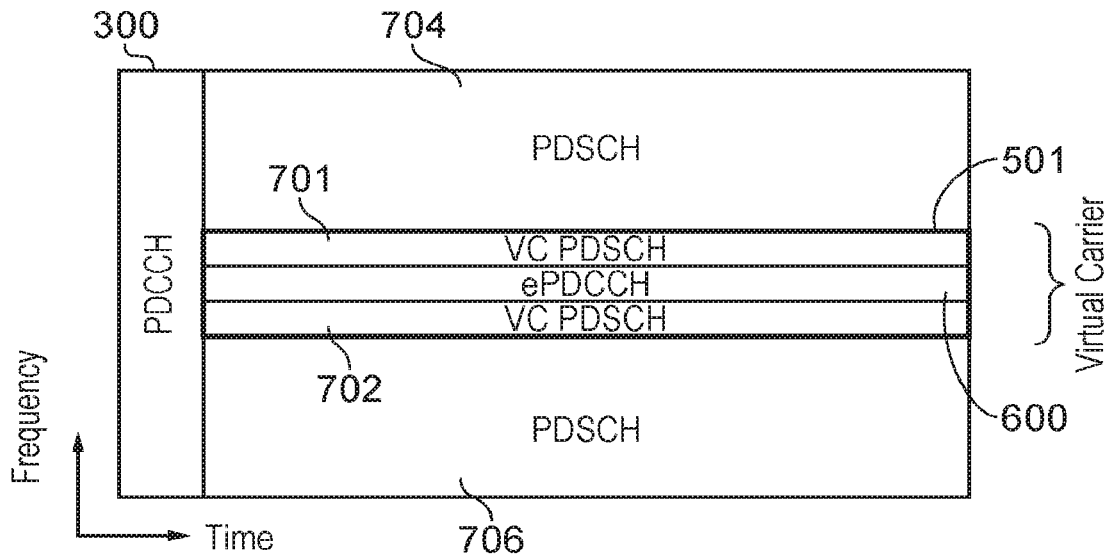
FIG. 7 ePDCCH Sharing (Localized)
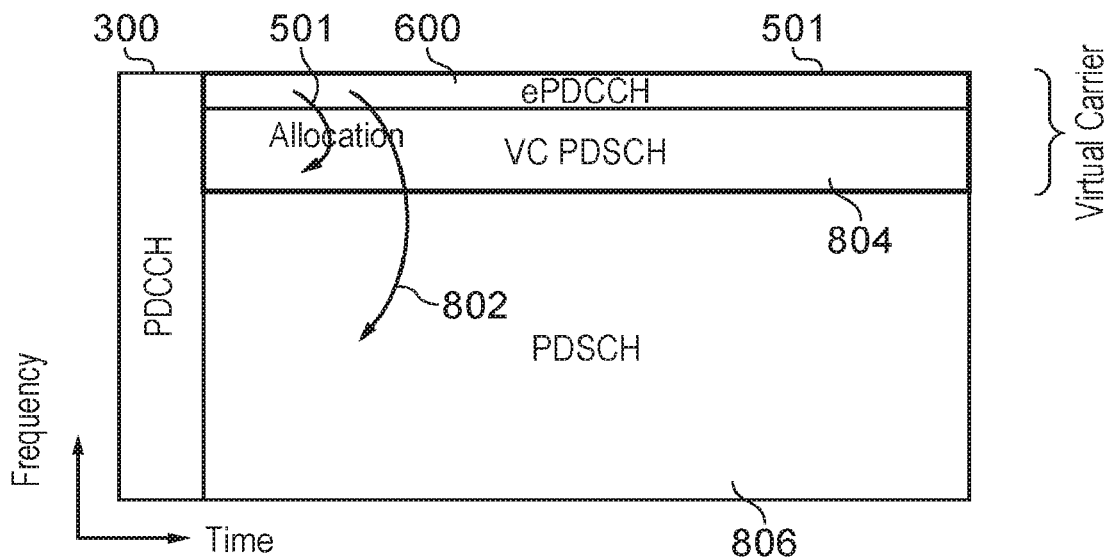
FIG. 8 Resource Allocation for VC PDSCH using ePDCCH

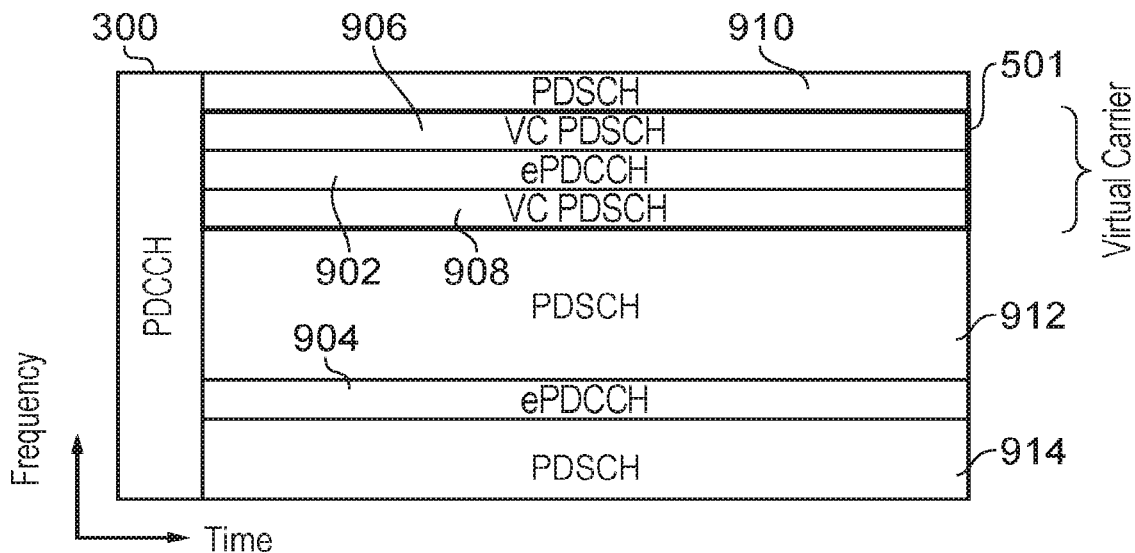
FIG. 9 ePDCCH Sharing (Distributed)
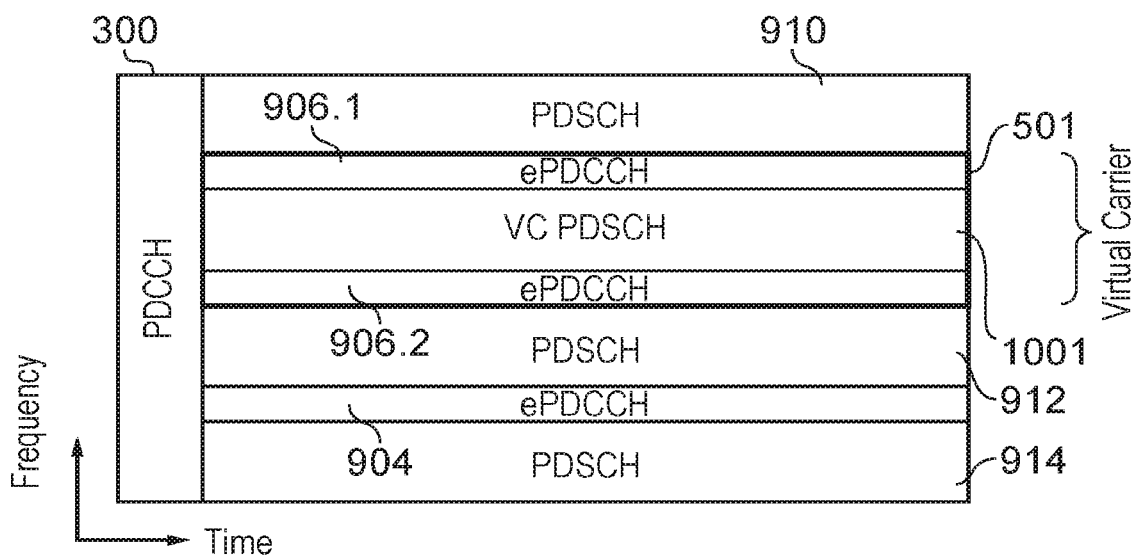
FIG. 10 ePDCCH Sharing 2 (Distributed)

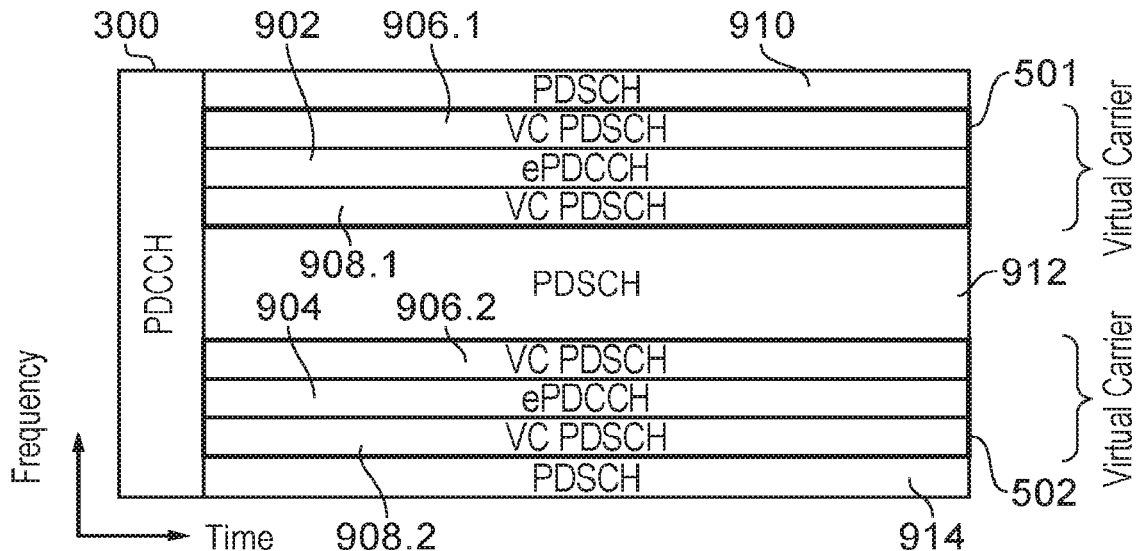
FIG. 11 ePDCCH Sharing 3 (Distributed)
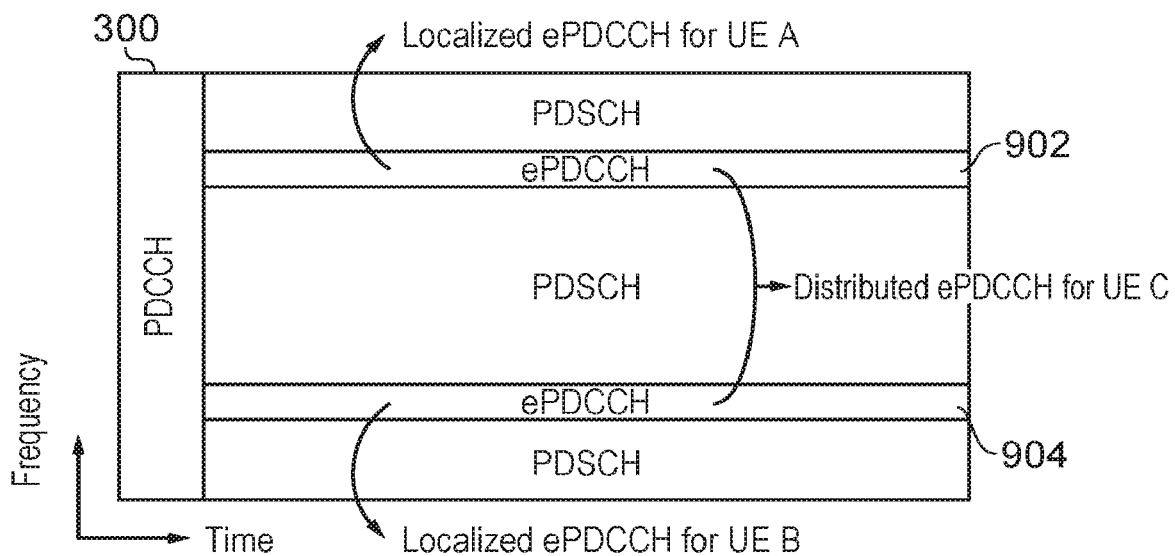
FIG. 12 ePDCCH Sharing (Localized & Distributed)

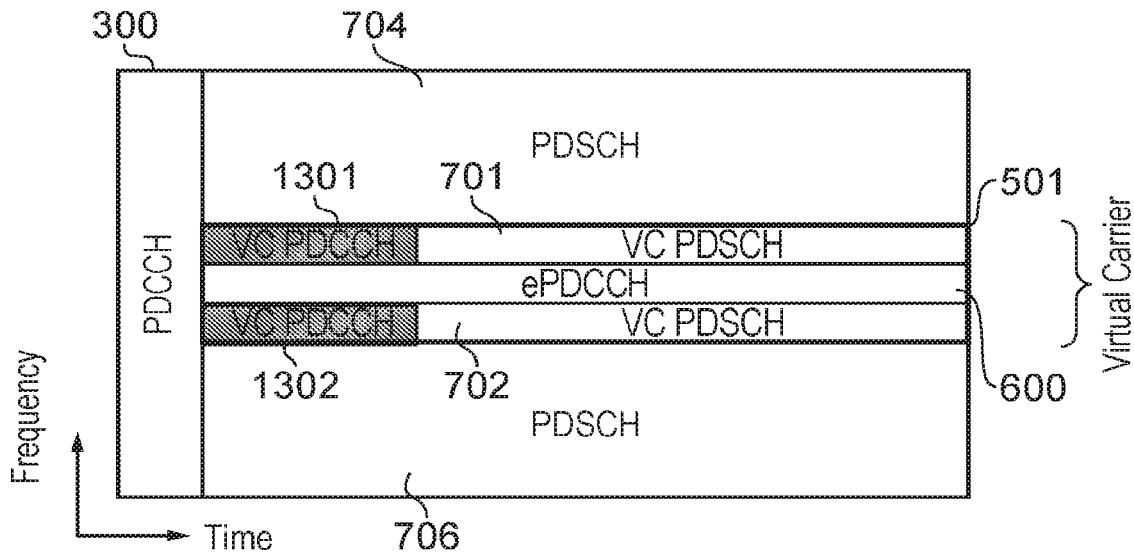
FIG. 13 VC-PDCCH with ePDCCH Sharing (Beginning)
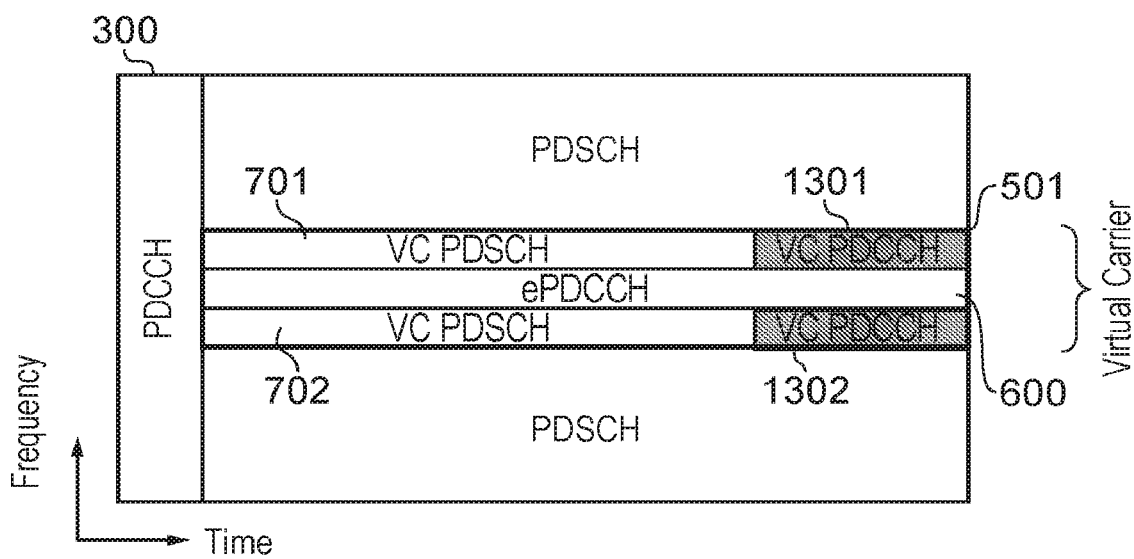
FIG. 14 VC-PDCCH with ePDCCH Sharing (End)

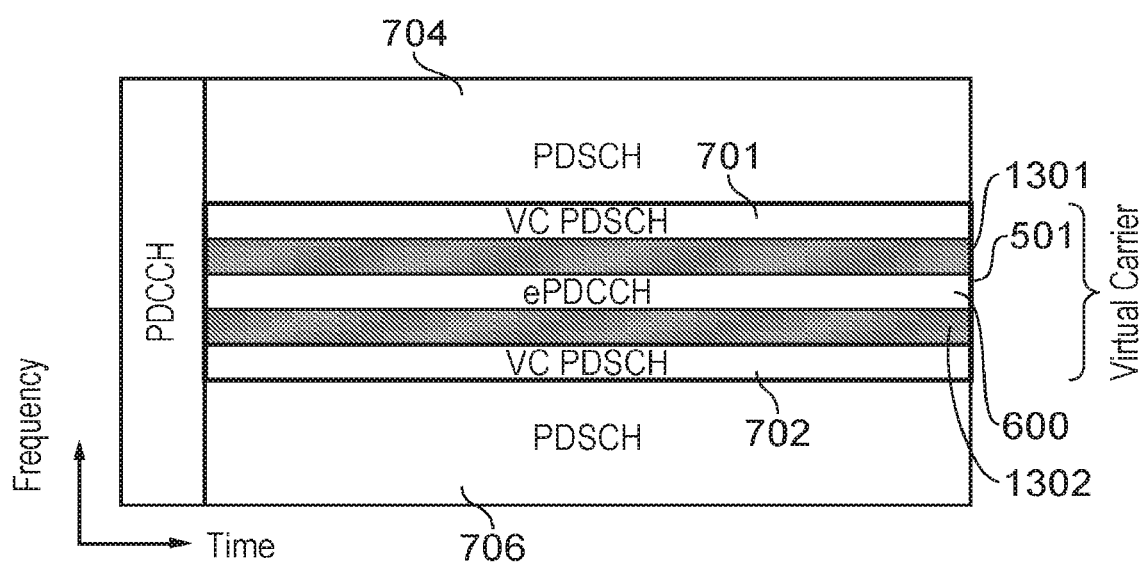
FIG. 15 VC-PDCCH with ePDCCH Sharing (Parallel)

COMMUNICATIONS DEVICE AND METHOD

CROSS-REFERENCE TO RELATED APPLICATIONS

This application is a continuation of U.S. application Ser. No. 14/414,169, filed Aug. 29, 2013, which is a national stage (under 35 U.S.C. 371) of International Patent Application No. PCT/GB2013/052274, filed Aug. 29, 2013, claiming priority to Great Britain Patent Application No. 1215581.8, filed Aug. 31, 2012, all of which are herein incorporated by reference in their entirety.

TECHNICAL FIELD OF THE DISCLOSURE

The present disclosure relates to mobile communications systems, network elements such as such base stations for use in mobile communications systems, methods of communicating using mobile communications systems and communications devices.

BACKGROUND OF THE DISCLOSURE

Third and fourth generation mobile telecommunication systems, such as those based on the 3GPP defined UMTS and Long Term Evolution (LTE) architecture are able to support more sophisticated services than simple voice and messaging services offered by previous generations of mobile telecommunication systems.

For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly.

The anticipated widespread deployment of third and fourth generation networks has led to the parallel development of a class of devices and applications which, rather than taking advantage of the high data rates available, instead take advantage of the robust radio interface and increasing ubiquity of the coverage area. Examples include so-called machine type communication (MTC) applications, which are typified by semi-autonomous or autonomous wireless communication devices (i.e. MTC devices) communicating small amounts of data on a relatively infrequent basis. Examples include so-called smart meters which, for example, are located in a customer's house and periodically transmit information back to a central MTC server data relating to the customers consumption of a utility such as gas, water, electricity and so on.

Whilst it can be convenient for a device such as an MTC type device to take advantage of the wide coverage area provided by a third or fourth generation mobile telecommunication network there are at present disadvantages. Unlike a conventional third or fourth generation mobile device such as a smartphone, an MTC-type device is preferably relatively simple and inexpensive. The type of functions performed by the MTC-type device (e.g. collecting and reporting back data) do not require particularly complex processing to perform. However, third and fourth generation mobile telecommunication networks typically employ advanced data modulation techniques on the radio interface which can require more complex and expensive radio transceivers to implement. It is usually justified to include such complex transceivers in a smartphone as a smartphone will typically require a powerful processor to perform typical smartphone type functions. However, as indicated above, there is now a desire to use relatively inexpensive and less complex devices to communicate using LTE type networks.

SUMMARY OF THE DISCLOSURE

According to a first aspect of the present disclosure there is provided a mobile communications system for communicating data to and/or from mobile communications devices. The mobile communications system comprises one or more base stations, each of which includes a transmitter and a receiver configured to provide a wireless access interface for communicating data to and/or from the mobile communications devices, the wireless access interface providing on a downlink a first carrier, the first carrier providing a plurality of communications resource elements across a first frequency range for communicating data and providing a plurality of communications resource elements within a second frequency range which is within and smaller than the first frequency range forming a second carrier. First mobile communications devices being full capability devices are configured to receive signals transmitted via the first carrier within the first frequency range, and second mobile communications devices being reduced capability devices are configured to receive signals transmitted via the second carrier within the second frequency range. The wireless access interface provided by the base stations includes a plurality of time divided sub-frames, each sub-frame including the plurality of communications resource elements of the first frequency range and the plurality of the communications resource elements of the second frequency range, and each sub-frame includes a first wideband control channel in a part of each sub-frame having a bandwidth corresponding substantially to the first frequency range, and a second narrow band control channel in a second part of each sub-frame and having a bandwidth which is less than the first wideband control channel and a duration of the second narrow band control channel within the sub-frame is greater than a duration of the first wideband control channel within the sub-frame. The second narrow band control channel is configured for communicating control information to both the first mobile communications devices and the second mobile communications devices and forms part of the plurality of the communications resource elements of the second frequency range of the virtual carrier.

By arranging for the narrow band control channel to be within the virtual carrier and to communicate control information to both the first and the second mobile communications devices, the second reduced capability devices can access the narrow band control channel which is shared with the first full-capability mobile devices. This arrangement makes more efficient use of the communications resources available to the communications system.

In conventional mobile telecommunication networks, data is typically transmitted from the network to the mobile devices in a frequency carrier (first frequency range) where at least part of the data spans substantially the whole of the bandwidth of the frequency carrier. Normally a mobile device cannot operate within the network unless it can receive and decode data spanning the entire frequency carrier, i.e. a maximum system bandwidth defined by a given telecommunication standard, and therefore the use of mobile devices with reduced bandwidth capability transceiver units is precluded.

However, as disclosed in co-pending International patent applications numbered PCT/GB2012/050213, PCT/GB2012/050214, PCT/GB2012/050223 and PCT/GB2012/051326 the contents of which are herein incorporated by reference, a subset of the communications resource elements comprising a conventional carrier (a "host carrier") are defined as a "virtual carrier", where the host carrier has a certain bandwidth (first frequency range) and where the virtual carrier has a reduced bandwidth (second frequency range) compared to the host carrier's bandwidth. Data for reduced capability devices is separately transmitted on the virtual carrier set of communications resource elements. Accordingly, data transmitted on the virtual carrier can be received and decoded using a reduced complexity or capability transceiver unit.

Devices provided with reduced complexity or capability transceiver units (onwards referred to as "reduced capability devices") could operate by using a part of its full capability (i.e. reduced capability set of its full capability) or they could be constructed to be less complex and less expensive than conventional LTE type devices (onwards referred to generally as LTE devices). Accordingly, the deployment of such devices for MTC type applications within an LTE type network can become more attractive because the provision of the virtual carrier allows mobile devices with less expensive and less complex transceiver units to be used.

It is currently being proposed to provide mobile communications systems, such as LTE for example, in which a plurality of sub-carrier are divided in time to provide sub-frames. Each sub-frame may include a wide band control channel region for transmitting a control channel for granting access to shared communications resources and may also include at least one narrow band control channel region which has a narrower bandwidth than the wide band control channel region but has a longer time duration and can be used to transmit a further control channel to communicate the same information or different information for the same purpose as the control channel information communicated on the wide band control channel. In one embodiment the narrow band control channel region has a duration which extends over substantially all of the remainder of a sub-frame after the wide band control channel region. The arrangement of a narrow band control channel region within a sub-frame together with a wide band control channel region has been proposed because the wide band control channel region could exist in the same part of the sub-frame of a wireless access interface and across all sub-carriers in the frequency band of the host carrier. Accordingly, it is possible that two base stations of neighbouring cells are transmitting different control channel information in the wide band control channel region contemporaneously which could, therefore interfere with each other. Accordingly, by providing a narrow band control channel region within each sub-frame which can be in a different location in frequency in the neighbouring cells, covering a different set of sub-carriers, for example, then control information can be communicated to mobile devices within different cells with a reduced potential for causing co-channel interference. Such an arrangement for example for LTE is being proposed in 3GPP. Within LTE therefore the wide band control channel is referred to as the Physical Downlink Control Channel (PDCCH) whereas the narrow band control channel is referred to as the Enhanced Physical Downlink Control Channel (EPDCCH), which is studied under the 3GPP work item "Enhanced downlink control channel(s) for LTE".

Embodiments of the present disclosure can provide an arrangement in which reduced capability mobile devices of a second type exist within a cell served by a base station with full capability devices of a first type and in which both a wide band control channel region and a narrow band control channel region is provided by a wireless access interface to the first and second types of mobile devices. The base station arranges for the wireless access interface to locate the narrow band control region within a second frequency range providing a virtual carrier which exists within a host carrier covering a first frequency range, the first frequency range including the second frequency range. Thus, a scheduler for example of the base station is adapted to locate the narrow band control channel (EPDCCH) as part of a virtual carrier within the second frequency range so that devices of the second type are able to receive control information granting access to communications resources from the narrow band control channel as well as devices of the first type also being granted access to communications resources from the narrow band control channel. However, as a result of the reduced capability of the mobile devices of the second type, the narrow band control channel grants access to communications resources only within the second frequency range whereas full capability devices of the first type may be granted access to shared resources within the first frequency range of the host carrier. Accordingly, the co-existence of full capability mobile devices of the first type with reduced capability mobile devices of the second type which receive control information granting access to communications resources from the same narrow band control channel provides an arrangement which efficiently uses communications resources available to the communications systems.

As will be appreciated because the reduced capability mobile devices of the second type only receive signals communicated within the second frequency range which is less than the first frequency range, so that the mobile devices of the second type cannot receive control information communicated on the wide band control channel. In one example the wide band control channel may communicate control information to mobile devices within a cell served by the base station which is required by the mobile devices to both transmit and receive information in the communications resources provided by the base station. According to one embodiment the control information is repeated and also transmitted in a separate control channel within the second frequency range of the virtual carrier. In one example the control information is what is known as Common Search Space (CSS) information which would be required by mobile devices to access the communications resources provided by the base station.

Various further aspects and embodiments of the disclosure are provided in the appended claims, including but not limited to, a mobile communications system network element for communicating data to and/or from mobile communications devices, used in a mobile communications network and a method of communicating data to and/or from mobile communications devices in a mobile communications system.

BRIEF DESCRIPTION OF DRAWINGS

Embodiments of the present disclosure will now be described by way of example only with reference to the accompanying drawings in which like parts are provided with corresponding reference numerals and in which:

FIG. 5 provides a schematic diagram illustrating an example of an LTE downlink radio sub-frame which includes a narrow band control channel for a localised application;

FIG. 6 provides a schematic diagram illustrating an example of an LTE downlink radio sub-frame which includes a narrow band control channel for a distributed application;

FIG. 7 provides a schematic diagram illustrating an example of an LTE downlink radio sub-frame in which a virtual carrier is provided and includes a narrow band control channel in accordance with an example embodiment;

FIG. 8 provides a schematic diagram illustrating an example of an LTE downlink radio sub-frame in which a virtual carrier is provided and includes a narrow band control channel in accordance with an example embodiment;

FIG. 9 provides a schematic diagram illustrating an example of an LTE downlink radio sub-frame in which a virtual carrier is provided and includes a distributed narrow band control channel in accordance with an example embodiment;

FIG. 10 provides a schematic diagram illustrating an example of an LTE downlink radio sub-frame in which a virtual carrier is provided and includes a distributed narrow band control channel in accordance with an example embodiment;

FIG. 11 provides a schematic diagram illustrating an example of an LTE downlink radio sub-frame in which two virtual carriers are provided and includes a distributed narrow band control channel in accordance with an example embodiment;

FIG. 12 provides a schematic diagram illustrating an example of an LTE downlink radio sub-frame which includes narrow band control channels for both localised and distributed applications in accordance with an example embodiment;

FIG. 13 provides a schematic diagram illustrating an example of an LTE downlink radio sub-frame in which a virtual carrier is provided and includes a narrow band control channel as well as a control channel for providing Common Search Space information in accordance with an example embodiment;

FIG. 14 provides a schematic diagram illustrating an example of an LTE downlink radio sub-frame in which a virtual carrier is provided and includes a narrow band control channel as well as a control channel for providing Common Search Space information in accordance with an example embodiment;

FIG. 15 provides a schematic diagram illustrating an example of an LTE downlink radio sub-frame in which a virtual carrier is provided and includes a narrow band control channel as well as a control channel for providing Common Search Space information in accordance with an example embodiment.

DESCRIPTION OF EXAMPLE EMBODIMENTS

Conventional Network

Figure 1:
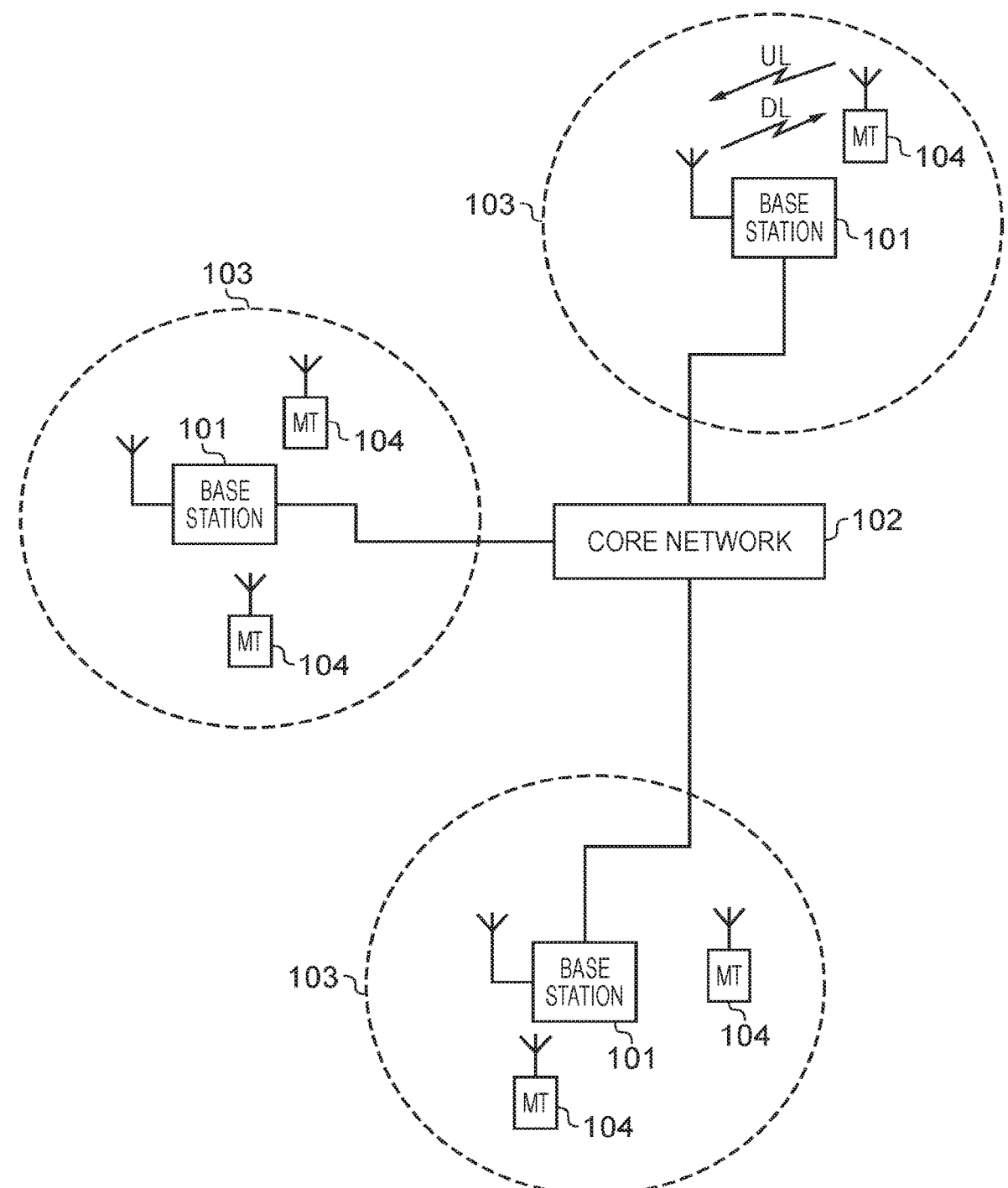
FIG. 1 provides a schematic diagram illustrating an example of a conventional mobile communications system.

FIG. 1 provides a schematic diagram illustrating the basic functionality of a conventional mobile communications system.

The network includes a plurality of base stations 101 connected to a core network 102. Each base station provides a coverage area 103 (i.e. a cell) within which data can be communicated to and from mobile devices 104. Data is transmitted from a base station 101 to a mobile device 104 within a coverage area 103 via a radio downlink. Data is transmitted from a mobile device 104 to a base station 101 via a radio uplink. The core network 102 routes data to and from the base stations 104 and provides functions such as authentication, mobility management, charging and so on.

The term mobile devices will be used to refer to a communications terminal or apparatus which can transmit or receive data via the mobile communications system. Other terms may also be used for mobile devices such as communications terminal, remote terminal, transceiver device or user equipment which may or may not be mobile.

Figure 2:
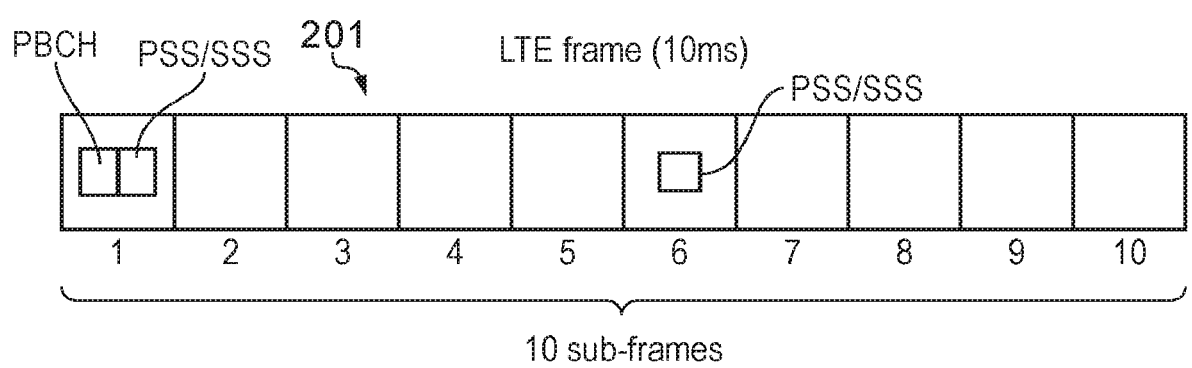
FIG. 2 provides a schematic diagram illustrating a conventional LTE downlink radio frame.

Mobile telecommunications systems such as those arranged in accordance with the 3GPP defined Long Term Evolution (LTE) architecture use an orthogonal frequency division multiplex (OFDM) based radio access interface for the radio downlink (so-called OFDMA) and the radio uplink (so-called SC-FDMA). Data is transmitted on the uplink and on the downlink on a plurality of orthogonal sub-carriers. FIG. 2 shows a schematic diagram illustrating an OFDM based LYE downlink radio frame 201. The LTE downlink radio frame is transmitted from an LTE base station (known as an enhanced Node B) and lasts 10 ms. The downlink radio frame comprises ten sub-frames, each sub-frame lasting 1 ms. A primary synchronisation signal (PSS) and a secondary synchronisation signal (SSS) are transmitted in the first and sixth sub-frames of the LTE frame, in the case of frequency division duplex (MD) system. A primary broadcast channel (PBCH) is transmitted in the first sub-frame of the LTE frame. The PSS, SSS and PBCH are discussed in more detail below.

Figure 3:
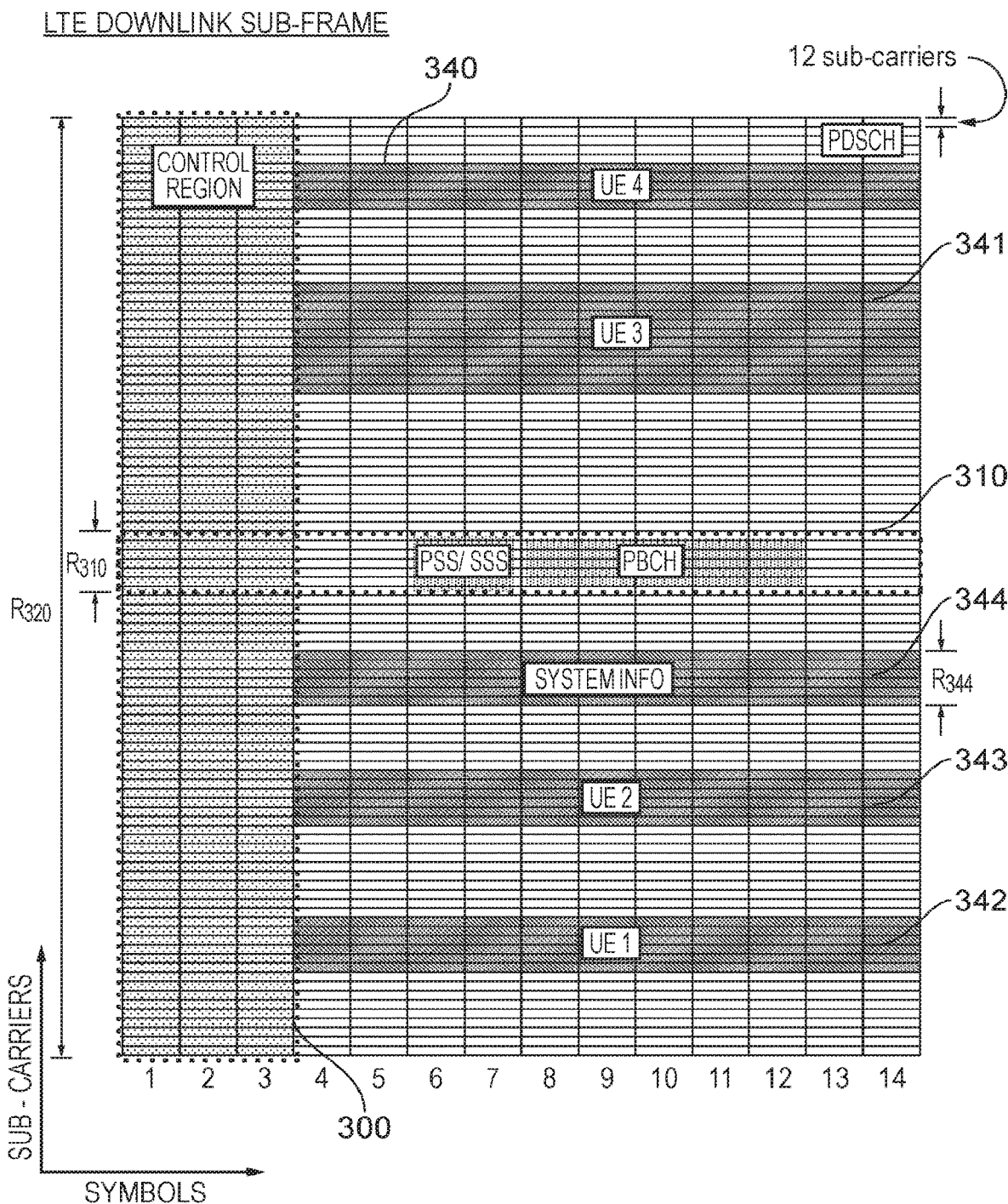
FIG. 3 provides a schematic diagram illustrating a conventional LTE downlink radio sub-frame.

FIG. 3 provides a schematic diagram providing a grid which illustrates the structure of an example of a conventional downlink LTE sub-frame. The sub-frame comprises a predetermined number of symbols which are transmitted over a 1 ms period. Each symbol comprises a predetermined number of orthogonal sub-carriers distributed across the bandwidth of the downlink radio carrier.

The example sub-frame shown in FIG. 3 comprises 14 symbols and 1200 sub-carriers spaced across a 20 MHz bandwidth. The smallest unit on which data can be transmitted in LTE is twelve sub-carriers transmitted over one sub-frame. For clarity, in FIG. 3, each individual resource element is not shown, instead each individual box in the sub-frame grid corresponds to twelve sub-carriers transmitted on one symbol.

FIG. 3 shows resource allocations for four LTE devices 340, 341, 342, 343. For example, the resource allocation 342 for a first LTE device (UE1) extends over five blocks of twelve sub-carriers, the resource allocation 343 for a second LTE device (UE2) extends over six blocks of twelve sub-carriers and so on.

Control channel data is transmitted in a control region 300 of the sub-frame comprising the first n symbols of the sub-frame where n can vary between one and three symbols for channel bandwidths of 3 MHz or greater and where n can vary between two and four symbols for channel bandwidths of 1.4 MHz. For clarity, the following description relates to host carriers with channel bandwidth of 3 MHz or greater where the maximum value of n will be 3. The data transmitted in the control region 300 includes data transmitted on the physical downlink control channel (PDCCH), the physical control format indicator channel (PCFICH) and the physical HARQ indicator channel (PHICH).

The PDCCH contains control data indicating which sub-carriers on which symbols of the sub-frame have been allocated to specific LTE devices. Thus, the PDCCH data transmitted in the control region 300 of the sub-frame shown in FIG. 3 would indicate that UE1 has been allocated the first block of resources 342, that UE2 has been allocated the second block of resources 343, and so on. In subframes where it is transmitted, the PCFICH contains control data indicating the duration of the control region in that subframe (i.e. between one and four symbols) and the PHICH contains HARQ (Hybrid Automatic Request) data indicating whether or not previously transmitted uplink data has been successfully received by the network.

In certain sub-frames, symbols in a central band 310 of the sub-frame are used for the transmission of information including the primary synchronisation signal (PSS), the secondary synchronisation signal (SSS) and the physical broadcast channel (PBCH). This central band 310 is typically 72 sub-carriers wide (corresponding to a transmission bandwidth of 1.08 MHz). The PSS and SSS are synchronisation signals that once detected allow the LTE device 104 to achieve frame synchronisation and determine the cell identity of the enhanced Node B transmitting the downlink signal. The PBCH carries information about the cell, comprising a master information block (MIB) that includes parameters that the LTE devices require to access the cell. Data transmitted to individual LTE devices on the physical downlink shared channel (PDSCH) can be transmitted in the remaining blocks of communications resource elements of the sub-frame.

FIG. 3 also shows a region of PDSCH containing system information and extending over a bandwidth of $R_{344}$.

The number of sub-carriers in an LTE channel can vary depending on the configuration of the transmission network. Typically this variation is from 72 sub carriers contained within a 1.4 MHz channel bandwidth to 1200 sub-carriers contained within a 20 MHz channel bandwidth as shown in FIG. 3. As is known in the art, data transmitted on the PDCCH, PCFICH and PHICH is typically distributed on the sub-carriers across the entire bandwidth of the sub-frame. Therefore a conventional LTE device must be able to receive the entire bandwidth of the sub-frame in order to receive and decode the control region.

Virtual Carrier

Certain classes of devices, such as MTC devices (e.g. semi-autonomous or autonomous wireless communication devices such as smart meters as discussed above), support communication applications that are characterised by the transmission of small amounts of data at relatively infrequent intervals and can thus be considerably less complex than conventional LTE devices. In many scenarios, providing reduced capability devices such as those with a conventional high-performance LTE receiver unit capable of receiving and processing data from an LTE downlink frame across the full carrier bandwidth can be overly complex for a device which only needs to communicate small amounts of data. This may therefore limit the practicality of a widespread deployment of reduced capability MTC type devices in an LTE network. It is preferable instead to provide reduced capability devices such as MTC devices with a simpler receiver unit which is more proportionate with the amount of data likely to be transmitted to the device. As set out below, in accordance with examples of the present disclosure a "virtual carrier" is inserted in a conventional OFDM type downlink carrier (i.e. a "host carrier") as a carrier with a limited frequency bandwidth narrower than that of the host carrier. Unlike data transmitted on a conventional OFDM type downlink carrier, data transmitted on the virtual carrier can be received and decoded without needing to process the full bandwidth of the downlink host OFDM carrier. Accordingly, data transmitted on the virtual carrier can be received and decoded using a reduced complexity receiver unit.

Figure 4:
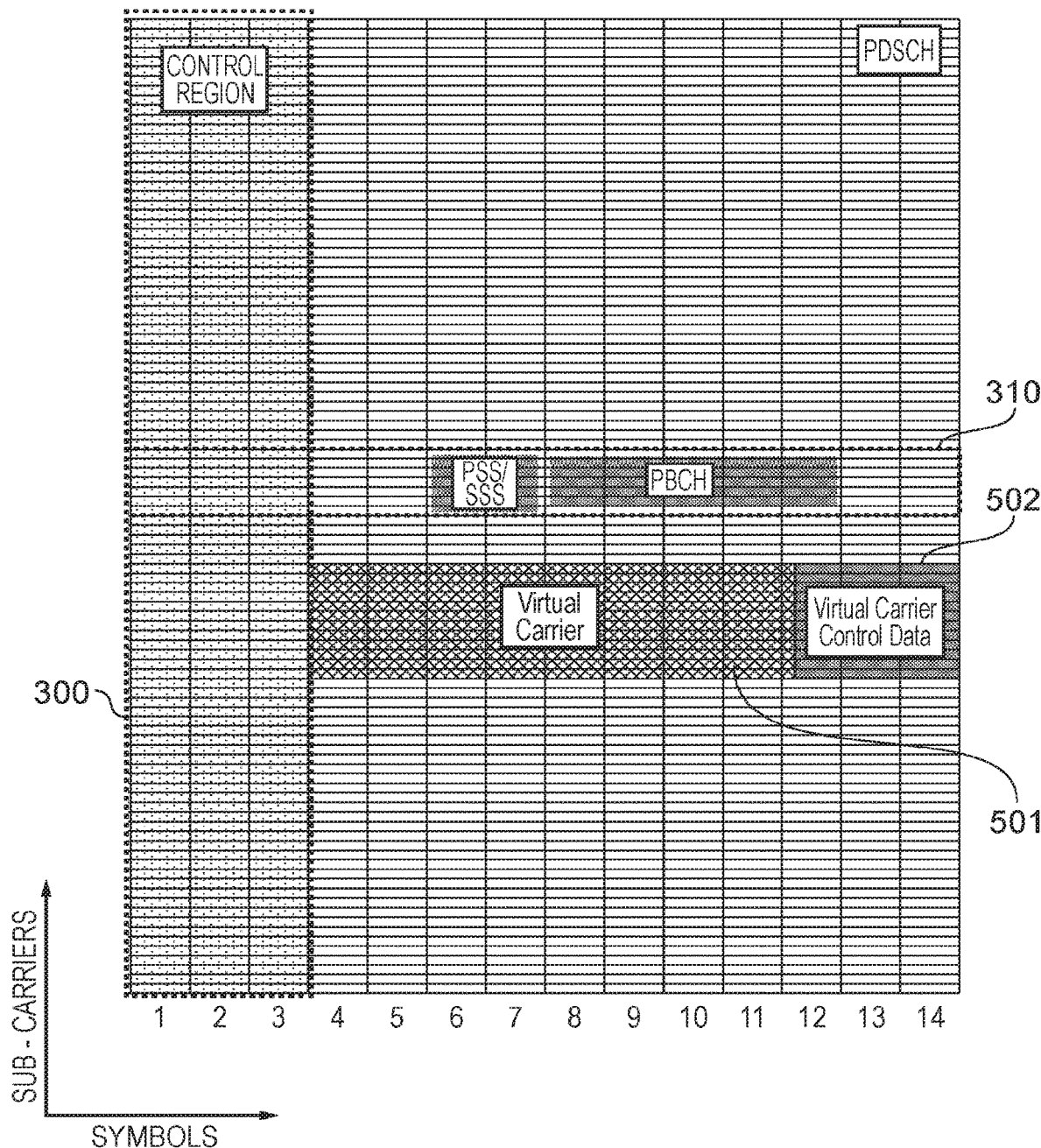
FIG. 4 provides a schematic diagram illustrating an LTE downlink radio sub-frame in which a virtual carrier has been inserted.

FIG. 4 provides a schematic diagram illustrating an LTE downlink sub-frame which includes a virtual carrier inserted in a host carrier in accordance with an example of the present disclosure.

In keeping with a conventional LTE downlink sub-frame, the first n symbols (n is three in FIG. 4) form the control region 300 which is reserved for the transmission of downlink control data such as data transmitted on the PDCCH. However, as can be seen from FIG. 4, outside of the control region 300 the LTE downlink sub-frame includes a group of communications resource elements below the central band 310 which form a virtual carrier 501. As will become clear, the virtual carrier 501 is adapted so that data transmitted on the virtual carrier 501 can be treated as logically distinct from the data transmitted in the remaining parts of the host carrier and can be decoded without first decoding all the control data from the control region 300. Although FIG. 4 shows the virtual carrier occupying frequency resources below the centre band, in general the virtual carrier can alternatively either occupy frequency resources above the centre band or frequency resources including the centre band. If the virtual carrier is configured to overlap any resources used by the PSS, SSS or PBCH of the host carrier, or any other signal transmitted by the host carrier that a mobile device operating on the host carrier would require for correct operation and expect to find in a known pre-determined location, the signals on the virtual carrier can be arranged such that these aspects of the host carrier signal are maintained.

As can be seen from FIG. 4, data transmitted on the virtual carrier 501 is transmitted across a limited bandwidth. This could be any suitable bandwidth providing it is smaller than that of the host carrier. In the example shown in FIG. 4 the virtual carrier is transmitted across a bandwidth comprising 12 blocks of 12 sub-carriers (i.e. 144 sub-carriers) which is equivalent to a 2.16 MHz transmission bandwidth. Accordingly, a device receiving data transmitted on the virtual carrier need only be equipped with a receiver capable of receiving and processing data transmitted over a bandwidth of 2.16 MHz. This enables reduced capability devices (for example MTC type devices) to be provided with simplified receiver units yet still be able to operate within an OFDM type communication network which, as explained above, conventionally requires devices to be equipped with receivers capable of receiving and processing an OFDM signal across the entire bandwidth of the signal.

As explained above, in OFDM based mobile communication systems such as LTE, downlink data is dynamically assigned to be transmitted on different sub-carriers on a sub-frame by sub-frame basis. Accordingly, in every sub-frame the network must signal which sub-carriers on which symbols contain data relevant to which devices (i.e. downlink allocation signalling).

As can be seen from FIG. 3, in a conventional downlink LTE sub-frame this information is transmitted on the PDCCH during the first symbol or symbols of the sub-frame. However, as previously explained, the information transmitted in the PDCCH is spread across the entire bandwidth of the sub-frame and therefore cannot be received by a mobile communication device with a simplified receiver unit capable only of receiving the reduced bandwidth virtual carrier.

Accordingly, as can be seen in FIG. 4, the final symbols of the virtual carrier can be reserved as a virtual carrier control region 502 which is allocated for the transmission of control data indicating which communications resource elements of the virtual carrier 501 have been allocated. In some examples the number of symbols comprising the virtual carrier control region 502 can be fixed for example symbols.

The virtual carrier control region can be located at any suitable position within the virtual carrier for example in the first few symbols of the virtual carrier. In the example of FIG. 4 this could mean positioning the virtual carrier control region on the fourth, fifth and sixth symbols. However, fixing the position of the virtual carrier control region in the final symbols of the sub-frame can provide an advantage because the position of the virtual carrier control region need not vary even if the number of symbols of the host carrier control region varies. This simplifies the processing undertaken by mobile communication devices receiving data on the virtual carrier because there is no need for them to determine the position of the virtual carrier control region every sub-frame as it is known that it will always be positioned in the final symbols of the sub-frame.

In a further example, the virtual carrier control symbols may reference virtual carrier PDSCH transmissions in a separate sub-frame.

In some examples the virtual carrier may be located within the centre band 310 of the downlink sub-frame. This would minimise the reduction in host carrier PDSCH resources caused by the insertion of a virtual carrier since the resources occupied by the PSS/SSS and PBCH would be contained within the virtual carrier region and not the host carrier PDSCGH region. Therefore, depending on for example the expected virtual carrier throughput, the location of a virtual carrier can be appropriately chosen to either exist inside or outside the centre band according to whether the host or virtual carrier is chosen to bear the overhead of the PSS, SSS and PBCH.

Narrow Band Control Channel

Embodiments of the present disclosure provide an arrangement m which a narrow band control channel which is common to both the full capability (LTE) mobile devices of a first type and reduced capability devices of a second type. The information transmitted on the control channel in the narrow band control region is the same as or similar to the information transmitted on the wide band control channel in the wide band control region which co-exists within a sub-frame of the wireless access interface. Such an arrangement which is currently being proposed in 3GPP is known as the EPDCCH which exists together with the PDCCH, which is a wide band control channel, An example arrangement is illustrated in FIG. 5.

In FIG. 5 a simplified version of a downlink sub-frame for an LTE system with respect to the example of FIG. 4 is presented. In FIG. 5 the control region 300 is shown in a corresponding position in which it appears in FIG. 4 and contains the PDCCH which communicates messages to mobile devices allocating communications resources which are shared by all full capability mobile devices. As shown in FIG. 5 a narrow band control channel region 600 is provided, which for LTE contains the EPDCCH. The narrow band control channel 600 communicates resource allocation messages to mobile devices. However, the narrow band control channel region is narrower in frequency than the wide band control channel region 300 and extends for substantially the entire sub-frame after the transmission of the wide band control channel 300. Hereinafter the narrow band control channel will be referred to as the EPDCCH and the wide band control channel is referred to as the PDCCH although the skilled person will appreciate that these are just examples of respective wide band and narrow band control channels, which are applicable for the LTE example.

As explained above the purpose of providing the EPDCCH 600 is to achieve communicating resource allocation messages to mobile devices in a way which reduces a likelihood of causing inter-cell interference for the transmission of control channels. As will be seen in FIG. 5 the PDCCH 300 occurs at the same part in the sub-frame for the entire band width of the sub-frame, for each sub-frame. Therefore, if two or more base stations of neighbouring cells are transmitting respective PDCCHs, these could potentially interfere because the PDCCH occurs at the same point in the sub-frame and across the entire band width of the system. Accordingly, it has been proposed to provide the EPDCCH 600 which extends across the entire sub-frame, and, as a narrow band control channel, can be located in different sub-carriers for neighbouring base stations. Accordingly, a probability of inter-cell interference is therefore reduced.

The arrangement shown in FIG. 5 is referred to as a localised EPDCCH 600 because the EPDCCH is transmitting control information to the mobile devices 104 within a cell 103. The arrangement shown in FIG. 6 is an alternative architecture for an EPDCCH having first and second parts at different frequencies 602, 604. The arrangement of the EPDCCH 602, 604 shown in FIG. 6 provides some frequency diversity for the transmission of control information via the EPDCCH. Thus, the same information can be transmitted on the EPDCCH 602, 604 of FIG. 6 as that transmitted by the EPDCCH 600 shown in FIG. 5. However, to improve a likelihood of correctly communicating the information to mobile devices resource allocation messages for example are transmitted using both parts of the EPDCCH 602, 604 shown in FIG. 6 in order to provide some frequency diversity. However, as will be appreciated with the example shown in FIG. 6 only full capability devices of the first type will be able to receive the distributed EPDCCH 602, 604.

Narrow Band Control Channel With Virtual Carrier Operation

Embodiments of the present disclosure have been devised to satisfy a requirement for reduced capability devices of the second type to receive control information such as resource allocation messages from a narrow band control channel such as the EPDCCH. As explained above with reference to FIG. 4 a virtual carrier 501 is provided for communicating with reduced capability communications devices. To this end, as shown in FIG. 7 the EPDCCH 600 is disposed by a base station to be within a frequency range of the virtual carrier. In one example as illustrated in FIG. 7, the EPDCCH 600 is located between the shared resources provided by the virtual carrier (VC) PDSCH 701, 702. As explained above the EPDCCH 600 which forms a narrow band control channel communicates control information to both the full capability communications devices of the first type and reduced capability mobile devices of the second type. However, the EPDCCH 600 when communicating resource allocation message to the reduced capability mobile communications devices of the second type allocates resources within the virtual carrier shared resources 701, 702 whereas when communicating resource allocation messages to the full capability mobile devices of the first type, the resource allocation messages allocate resources within the shared resources of the host carrier 704, 706. A further example arrangement is shown in FIG. 8 in which arrows 801, 802 show respectively the allocation of resources to the mobile devices of shared resources within the virtual carrier 801 and the shared resources within the host carrier 806.

Distributed Narrow Band Control Channel

A further example embodiment in which a narrow band control channel is provided for operation with a virtual carrier is shown in FIG. 9. The example shown in FIG. 9 is for a situation which corresponds to the arrangement illustrated in FIG. 6 of a distributed EPDCCH. Thus as shown in FIG. 9 an EPDCCH is distributed between a first part 902 and a second part 904 but otherwise operates in a corresponding way to that explained above with reference to FIGS. 7 and 8. However, as shown in FIG. 9 only the first part of the EPDCCH 902 is disposed within a second frequency range of the virtual carrier 501 whereas a second part 904 is disposed within a first frequency range of the host carrier. Accordingly, whilst full capability mobile devices of the first type can use a frequency diversity provided by the first and second parts of the EPDCCH 902, 904, reduced capability mobile devices of the first type can only receive control channel messages such as resource allocation messages from within the EPDCCH 902 of the first part. Accordingly, some adaptation of the control channel messages communicated to the reduced capability communications devices may be made such as increasing channel coding such as error correction coding or reducing modulation order. As the example shown in FIGS. 7 and 8, the reduced capability devices receiving resource allocation messages from the EPDCCH first part 902 will only be allocated resources within the virtual carrier 501 in the shared resources 906, 908 whereas foil capability devices will be allocated resources within the shared channel 910, 912, 914.

Corresponding examples to that shown in FIG. 9 are provided in FIGS. 10 and 11 where like parts have the same numerical references. For the example shown in FIG. 10 an EPDCCH which is distributed between two parts 906.1, 906.2 within the virtual carrier range 501 is shown. According to this example reduced capability communications devices can be allocated resources within the shared channel 1001 using an EPDCCH which has a first part 906.1 and second part 906.2 thereby providing some frequency diversity to the communication of the resource allocation messages. The example shown in FIG. 11 corresponds to the example of FIG. 9 in which two distributed EPDCCH parts 902, 904 are each respectively within two virtual carrier areas 501, 502.

A further variation is illustrated in FIG. 12 in which a distributed EPDCCH having first and second parts 902, 904 is adapted to communicate control information to different groups of mobile devices. In the example shown, a first group of communications devices UEA receives control information only from the EPDCCH first part 902 and a second group of communications devices UEB receives control information from the EPDCCH second part 904. However, a third group of mobile devices UEC receives control information from the first and second parts of EPDCCH 902, 904.

Common Search Space

As explained above, the narrow band control channel which in the example given is the EPDCCH may convey some of the same information as a wide band control channel region which is the PDCCH in this example. However, the wide hand control channel, PDCCH, may convey other information which is necessary for mobile devices to transmit via the uplink or receive via the downlink communications signals. In one example of LTE such control channel or signaling information is referred to as the Common Search Space information. However, as explained above for a virtual carrier operation mobile communications devices of a reduced capability cannot receive information from the wide band control channel PDCCH.

Embodiments of a further example include a control channel within the virtual carrier 501 for communicating control information which is necessary for the mobile devices of reduced capability to transmit and to receive via the wireless access interface. Three examples are illustrated of such an arrangement in FIGS. 13, 14 and 15. As shown in FIG. 13, which corresponds generally to the example shown in FIG. 7, and so corresponding parts contain the same numerical references, a control channel is formed within the shared resource space 701, 702 of the virtual carrier 501 which is shown as a darker area 1301, 1302. Thus the control channel for conveying for example Common Search Space information is divided into a first part 1301 and a second part 1302 to provide some frequency diversity. The arrangement of the control channel 1301, 1302 to provide Common Search Space information which is based on the Common Search Space information communicated in the wide band PDCCH 300 conveys to reduced capability devices necessary control information for communicating via the shared channel on the uplink or the downlink. For example the Common Search Space information may include information relevant to random access procedure, paging, system information transmission, uplink transmission power control and other information necessary for the mobile devices to communicate via the shared resource, FIG. 14 provides an example which corresponds to that shown in FIG. 13 but the control channel for conveying Common Search Space information 1301, 1302 is located in a different part of the sub-frame to that shown in FIG. 13. FIG. 15 provides a further example in which the control channel for conveying Common Search Space information 1301, 1302 extends in a narrow band arrangement in time from the wide band control channel 300 to substantially the entire part of the sub-frame.

Example Architecture

Figure 16:
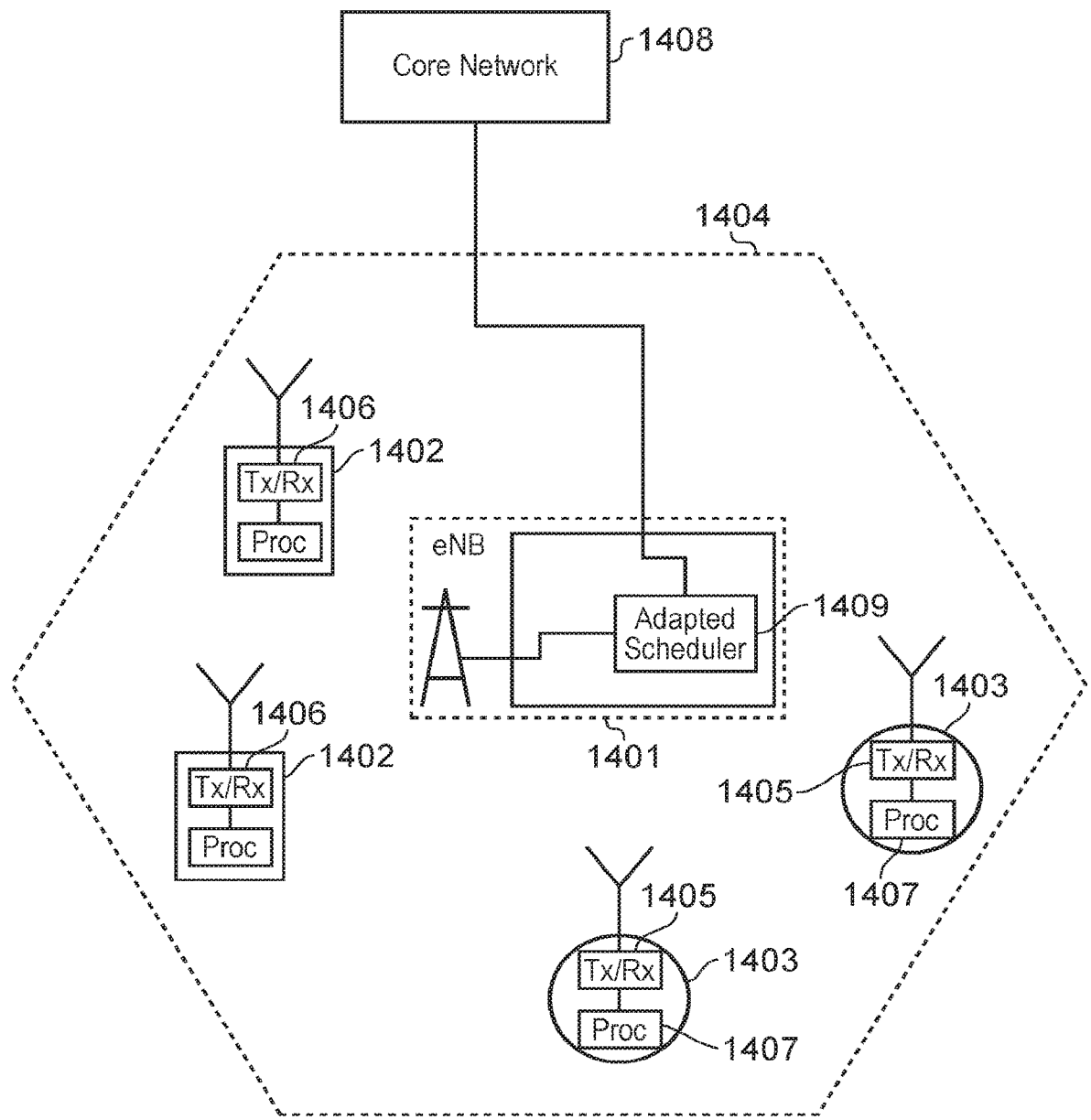
FIG. 16 provides a schematic diagram showing part of an adapted LTE mobile telecommunication network arranged in accordance with an example of the present disclosure.

FIG. 16 provides a schematic diagram showing part of an adapted LTE mobile communications system. The system includes an adapted enhanced Node B (eNB) 1401 connected to a core network 1408 which communicates data to a plurality of conventional LTE devices 1402 and reduced capability devices 1403 within a coverage area (i.e. cell) 1404. Each of the reduced capability devices 1403 has a transceiver unit 1405 which includes a receiver unit capable of receiving data across a reduced bandwidth and a transmitter unit capable of transmitting data across a reduced bandwidth (or full bandwidth of an uplink carrier supported by the eNB 1401) when compared with the capabilities of the transceiver units 1406 included in the conventional LTE devices 1402.

The adapted eNB 1401 is arranged to transmit downlink data using a sub-frame structure that includes a virtual carrier as described above for example with reference to FIGS. 4 to 15. The reduced capability devices 1403 are thus able to receive and transmit data using the uplink and downlink virtual carriers as described above.

As has been explained above, because the reduced complexity devices 1403 receive data across a reduced bandwidth downlink virtual carriers, the complexity, power consumption and cost of the transceiver unit 1405 needed to receive and decode downlink data and to encode and transmit uplink data is reduced compared to the transceiver unit 1406 provided in the conventional LTE devices.

When receiving downlink data from the core network 1408 to be transmitted to one of the devices within the cell 1404, the adapted eNB 1401 is arranged to determine if the data is bound for a conventional LTE device 1402 or a reduced capability device 1403. This can be achieved using any suitable technique. For example, data bound for a reduced capability device 1403 may include a virtual carrier flag indicating that the data must be transmitted on the downlink virtual carrier. If the adapted eNB 1401 detects that downlink data is to be transmitted to a reduced capability device 1403, an adapted scheduling unit 1409 included in the adapted eNB 1401 ensures that the downlink data is transmitted to the reduced capability device in question on the downlink virtual carrier. In another example the network is arranged so that the virtual carrier is logically independent of the eNB. More particularly the virtual carrier is arranged to appear to the core network as a distinct cell. From the perspective of the core network it is not known that the virtual carrier is physically co-located with, or has any interaction with, the host carrier of the cell. Packets are routed to/from the virtual carrier just as they would be for any normal cell.

In another example, packet inspection is performed at a suitable point within the network to route traffic to or from the appropriate carrier (i.e. the host carrier or the virtual carrier).

In yet another example, data from the core network to the eNB is communicated on a specific logical connection for a specific mobile device. The eNB is provided with information indicating which logical connection is associated with which mobile device. Information is also provided at the eNB indicating which mobile devices are reduced capability devices and which are conventional LTE devices. This information could be derived from the fact that a reduced capability device would initially have connected using virtual carrier resources. In other examples reduced capability devices are arranged to indicate their capability to the eNB during the connection procedure. Accordingly the eNB can map data from the core network to a specific mobile device based on whether the mobile device is a reduced capability device or an LTE device.

When scheduling resources for the transmission of uplink data, the adapted eNB 1401 is arranged to determine if the device to be scheduled resources is a reduced capability device 1403 or a conventional LTE device 1402. In some examples this is achieved by analysing the random access request transmitted on the PRACH using the techniques to distinguish between a virtual carrier random access request and a conventional random access request as described above. In any case, when it has been determined at the adapted eNB 1401 that a random access request has been made by a reduced capability device 1402, the adapted scheduler 1409 is arranged to ensure that any grants of uplink communications resource elements are within the virtual uplink carrier.

In some examples, the virtual carrier inserted within the host carrier can be used to provide a logically distinct "network within a network". In other words data being transmitted via the virtual carrier can be treated as logically and physically distinct from the data transmitted by the host carrier network. The virtual carrier can therefore be used to implement a so-called dedicated messaging network (DMN) which is "laid over" a conventional network and used to communicate messaging data to DMN devices (i.e. reduced capability devices).

Various modifications can be made to examples of the present disclosure. Embodiments of the present disclosure have been defined largely in terms of reduced capability devices transmitting data via a virtual carrier inserted in a conventional LTE based host carrier. However, it will be understood that any suitable device can transmit and receive data using the described virtual carriers for example devices which have the same capability as a conventional LTE type device or devices which have enhanced capabilities.

Furthermore, it will be understood that the general principle of inserting a virtual carrier on a subset of uplink or downlink resources can be applied to any suitable mobile telecommunication technology and need not be restricted to systems employing an LTE based radio interface.

Various further aspects and features of the present invention are defined in the following numbered clauses:

1. A communications device for transmitting data to or receiving data from a mobile communications network, the mobile communications network providing a wireless access interface for the communications device, the communications device comprising:
   a transmitter unit adapted to transmit data to base stations of the mobile communications network via the wireless access interface provided by the base stations, wherein the wireless access interface providing
   in a downlink, a first carrier, the first carrier providing a plurality of communications resource elements across a first frequency range for communicating data and providing a plurality of communications resource elements within a second frequency range which is within and smaller than
      the first frequency range forming a second carrier,
      a plurality of time divided sub-frames, each sub-frame including the plurality of communications resource elements of the first frequency range and the plurality of the communications resource elements of the second frequency range, and each sub-frame includes
      bandwidth which is less than the first wideband control channel and; and
   a receiver unit adapted to operate with a receiver band width corresponding to the second frequency range and is configured to receive control information from the second narrow band control channel to access the plurality of the communications resource elements of the second frequency range of the second carrier.

2. A communications device according to clause 1, wherein the receiver unit is
   configured to receive a second resource allocation messages from the second narrow band control channel, the second resource allocation messages providing an indication of communications resource elements in the second frequency range of the second carrier which have been allocated to communications device, the resources allocated to the second mobile devices being allocated within the second frequency range of the second carrier.

3. A communications device according to clause 1 or 2, wherein the receiver unit configured to receive common control information from a control channel formed within the second frequency range of the second carrier, the common control information including signalling information for use by the communications devices to transmit and receive data via the plurality of communications resource elements of the second frequency range.

4. A communications device according to clause 1, 2 or 3, wherein the communications device is configured to operate in accordance with a Long Term Evolution (LTE) based system, and the wide band control channel is an Physical Downlink Control Channel (PDCCH), the narrow band control channel is an Enhanced Physical Downlink Control Channel (EPDCCH) and a plurality of the communications resource elements form part of a Physical Downlink Shared Channel (PDSCH).

5. A method of operating a communications device to transmit data to or receive data from a mobile communications network, the mobile communications network providing a wireless access interface for the communications device, the wireless access interface providing, on a downlink, a first carrier, the first carrier providing a plurality of communications resource elements across a first frequency range for communicating data and providing a plurality of communications resource elements within a second frequency range which is within and smaller than the first frequency range forming a second carrier, the method comprising:
a first wideband control channel in a part of each sub-frame having a bandwidth corresponding substantially to the first frequency range, and
a second narrow band control channel in a second part of each sub-frame and having a transmitting data to base stations of the mobile communications network via the wireless access interface provided by the base stations and receiving data from the base stations of the mobile communications network via the wireless access interface provided by the base stations, wherein the data is received in a receiver band width corresponding to the second frequency range, the data received from the base stations being provided in a plurality of time divided sub-frames, each sub-frame including the plurality of communications resource elements of the first frequency range and the plurality of the communications resource elements of the second frequency range, and each sub-frame includes bandwidth which is less than the first wideband control channel and a duration of the second narrow band control channel within the sub-frame is greater than a duration of the first wideband control channel within the sub-frame, and the method further comprises:
receiving control information from the second narrow band control channel to access the plurality of the communications resource elements of the second frequency range of the second carrier.

6. A method according to clause 5, further comprising:
receiving second resource allocation messages from the second narrow band control channel, the second resource allocation messages providing an indication of communications resource elements in the second frequency range of the second carrier which have been allocated to the communications device, the resources allocated to the second mobile devices being allocated within the second frequency range of the second carrier.

7. A method according to clause 5 or 6, further comprising: receiving common control information from a control channel formed within the second frequency range of the second carrier, the common control information including signalling information for use by the communications devices to transmit and receive data via the plurality of communications resource elements of the second frequency range.

8. A method according to clause 5, 6 or 7, wherein the communications device is configured to operate in accordance with a Long Term Evolution system, and the wide band control channel is an Physical Downlink Control Channel (PDCCH), the narrow band control channel is an an Enhanced Physical Downlink Control Channel (EPDCCH) and a plurality of the communications resource elements form part of a Physical Downlink Shared Channel (PDSCH).

The invention claimed is:
1. Circuitry for a communications device for transmitting data to or receiving data from a mobile communications network, the mobile communications network providing a wireless access interface for the communications device, the circuitry comprising:
transmitting circuitry configured to transmit data to base stations of the mobile communications network via the wireless access interface provided by the base stations, wherein the wireless access interface providing
in a downlink, a first carrier, the first carrier providing a plurality of communications resource elements across a first frequency range for communicating data and providing a plurality of communications resource elements within a second frequency range which is within and smaller than the first frequency range forming a second carrier,
a plurality of time divided sub-frames, each sub-frame including the plurality of communications resource elements of the first frequency range and the plurality of the communications resource elements of the second frequency range, and each sub-frame includes a first wideband control channel in a part of each sub-frame having a bandwidth corresponding substantially to the first frequency range, and
a second narrow band control channel in a second part of each sub-frame and having a bandwidth which is less than the first wideband control channel; and
receiving circuitry configured to operate with a receiver bandwidth corresponding to the second frequency range and is configured to receive control information from the second narrow band control channel to access the plurality of the communications resource elements of the second frequency range of the second carrier,
wherein the receiving circuitry is configured to receive second resource allocation messages from the second narrow band control channel, the second resource allocation messages providing an indication of communications resource elements in the second frequency range of the second carrier which have been allocated to the communications device, the resources allocated to second communications devices being allocated within the second frequency range of the second carrier,
wherein the wide band control channel is a Physical Downlink Control Channel (PDCCH) and the narrow band control channel is an Enhanced Physical Downlink Control Channel (EPDCCH),
wherein the second narrow band control channel begins in time after the first wideband control channel,
wherein the narrow band control channel is distributedly transmitted in a first part and a second part, and the first part and second part have separate frequencies, and the first part and second part are not contiguous in frequency,
wherein the first part is surrounded by two Virtual Carrier Physical Downlink Shared Channel (VC PDSCH)

regions such that the first part is contiguous with the VC PDSCH regions on each side in frequency, wherein the two VC PDSCH regions are separate from a larger PDSCH region, wherein the communications device is configured to obtain control information from resources in the first part for locating resources in the VC PDSCH regions, wherein the second part is not adjacent to the two VC PDSCH regions, and wherein the VC PDSCH regions and the first part are part of the second carrier.

2. The communications device of claim 1, wherein the receiving circuitry is configured to receive common control information from a control channel formed within the second frequency range of the second carrier, the common control information including signalling information for use by the communications device to transmit and receive data via the plurality of communications resource elements of the second frequency range.

3. The communications device of claim 1, wherein the communications device is configured to operate in accordance with a Long Term Evolution (LTE) based system, and a plurality of the communications resource elements form part of a Physical Downlink Shared Channel (PDSCH).

4. Circuitry for a communications device for transmitting data to or receiving data from a mobile communications network, the mobile communications network providing a wireless access interface for the communications device, the circuitry comprising:

transmitting circuitry configured to transmit data to the mobile communications network via the wireless access interface, wherein the wireless access interface providing in a downlink, a first carrier, the first carrier providing a plurality of communications resource elements across a first frequency range for communicating data and providing a plurality of communications resource elements within a second frequency range which is within and smaller than the first frequency range forming a second carrier, a plurality of time divided sub-frames, each sub-frame including the plurality of communications resource elements of the first frequency range and the plurality of the communications resource elements of the second frequency range, and each sub-frame includes a first wideband control channel in a part of each sub-frame having a bandwidth corresponding substantially to the first frequency range, and a second narrow band control channel in a second part of each sub-frame and having a bandwidth which is less than the first wideband control channel; and receiving circuitry configured to operate with a receiver bandwidth corresponding to the second frequency range and is configured to receive control information from the second narrow band control channel to access the plurality of the communications resource elements of the second frequency range of the second carrier, wherein the receiving circuitry is configured to receive second resource allocation messages from the second narrow band control channel, the second resource allocation messages providing an indication of communications resource elements in the second frequency range of the second carrier which have been allocated to the communications device, the resources allocated to second communications devices being allocated within the second frequency range of the second carrier, wherein the wide band control channel is a Physical Downlink Control Channel (PDCCH) and the narrow band control channel is an Enhanced Physical Downlink Control Channel (EPDCCH), wherein the second narrow band control channel begins in time after the first wideband control channel, wherein the narrow band control channel is distributedly transmitted in a first part and a second part, and the first part and second part have separate frequencies, and the first part and second part are not contiguous in frequency, wherein the first part is surrounded by two Virtual Carrier Physical Downlink Shared Channel (VC PDSCH) regions such that the first part is contiguous with the VC PDSCH regions on each side in frequency, wherein the two VC PDSCH regions are separate from a larger PDSCH region, wherein the communications device is configured to obtain control information from resources in the first part for locating resources in the VC PDSCH regions, wherein the second part is not adjacent to the two VC PDSCH regions, and wherein the VC PDSCH regions and the first part are part of the second carrier.

5. The communications device of claim 4, wherein the receiving circuitry is configured to receive common control information from a control channel formed within the second frequency range of the second carrier, the common control information including signalling information for use by the communications device to transmit and receive data via the plurality of communications resource elements of the second frequency range.

6. The communications device of claim 4, wherein the communications device is configured to operate in accordance with a Long Term Evolution (LTE) based system, and a plurality of the communications resource elements form part of a Physical Downlink Shared Channel (PDSCH).

7. Circuitry for a base station for transmitting data to or receiving data from a mobile communications network, the mobile communications network providing a wireless access interface for a communications device, the circuitry comprising:

receiving circuitry configured to receive data from the communications device of the mobile communications network via the wireless access interface provided by the base station, wherein the wireless access interface providing in a downlink, a first carrier, the first carrier providing a plurality of communications resource elements across a first frequency range for communicating data and providing a plurality of communications resource elements within a second frequency range which is within and smaller than the first frequency range forming a second carrier, a plurality of time divided sub-frames, each sub-frame including the plurality of communications resource elements of the first frequency range and the plurality of the communications resource elements of the second frequency range, and each sub-frame includes a first wideband control channel in a part of each sub-frame having a bandwidth corresponding substantially to the first frequency range, and a second narrow band control channel in a second part of each sub-frame and having a bandwidth which is less than the first wideband control channel; and transmitting circuitry configured to operate with a transmitter bandwidth corresponding to the second frequency range and is configured to transmit control information from the second narrow band control channel to access the plurality of the communications resource elements of the second frequency range of the second carrier, wherein the transmitting circuitry is configured to transmit second resource allocation messages from the second narrow band control channel, the second resource allocation messages providing an indication of communications resource elements in the second frequency range of the second carrier which have been allocated to the communications device, the resources allocated to second communications devices being allocated within the second frequency range of the second carrier, wherein the wide band control channel is a Physical Downlink Control Channel (PDCCH) and the narrow band control channel is an Enhanced Physical Downlink Control Channel (EPDCCH), wherein the second narrow band control channel begins in time after the first wideband control channel, wherein the narrow band control channel is distributedly transmitted in a first part and a second part, and the first part and second part have separate frequencies, and the first part and second part are not contiguous in frequency, wherein the first part is surrounded by two Virtual Carrier Physical Downlink Shared Channel (VC PDSCH) regions such that the first part is contiguous with the VC PDSCH regions on each side in frequency, wherein the two VC PDSCH regions are separate from a larger PDSCH region, wherein the communications device is configured to obtain control information from resources in the first part for locating resources in the VC PDSCH regions, wherein the second part is not adjacent to the two VC PDSCH regions, and wherein the VC PDSCH regions and the first part are part of the second carrier.

8. A communications method for a base station for transmitting data to or receiving data from a mobile communications network, the mobile communications network providing a wireless access interface for a communications device, the method comprising:

receiving, by receiving circuitry of the base station, data from the communications device of the mobile communications network via the wireless access interface provided by the base station, wherein the wireless access interface providing in a downlink, a first carrier, the first carrier providing a plurality of communications resource elements across a first frequency range for communicating data and providing a plurality of communications resource elements within a second frequency range which is within and smaller than the first frequency range forming a second carrier, a plurality of time divided sub-frames, each sub-frame including the plurality of communications resource elements of the first frequency range and the plurality of the communications resource elements of the second frequency range, and each sub-frame includes a first wideband control channel in a part of each sub-frame having a bandwidth corresponding substantially to the first frequency range, and a second narrow band control channel in a second part of each sub-frame and having a bandwidth which is less than the first wideband control channel; and transmitting, by transmitting circuitry of the base station, control information from the second narrow band control channel to access the plurality of the communications resource elements of the second frequency range of the second carrier, wherein the transmitting circuitry is configured to operate with a transmitter bandwidth corresponding to the second frequency range, transmitting, by the transmitting circuitry, second resource allocation messages from the second narrow band control channel, the second resource allocation messages providing an indication of communications resource elements in the second frequency range of the second carrier which have been allocated to the communications device, the resources allocated to second communications devices being allocated within the second frequency range of the second carrier, wherein the wide band control channel is a Physical Downlink Control Channel (PDCCH) and the narrow band control channel is an Enhanced Physical Downlink Control Channel (EPDCCH), wherein the second narrow band control channel begins in time after the first wideband control channel, wherein the narrow band control channel is distributedly transmitted in a first part and a second part, and the first part and second part have separate frequencies, and the first part and second part are not contiguous in frequency, wherein the first part is surrounded by two Virtual Carrier Physical Downlink Shared Channel (VC PDSCH) regions such that the first part is contiguous with the VC PDSCH regions on each side in frequency, wherein the two VC PDSCH regions are separate from a larger PDSCH region, wherein the communications device is configured to obtain control information from resources in the first part for locating resources in the VC PDSCH regions, wherein the second part is not adjacent to the two VC PDSCH regions, and wherein the VC PDSCH regions and the first part are part of the second carrier.

* * * * *